Dec. 20, 1927.
L. B. LARSEN
1,653,578
CUTTER
Filed Oct. 26, 1926
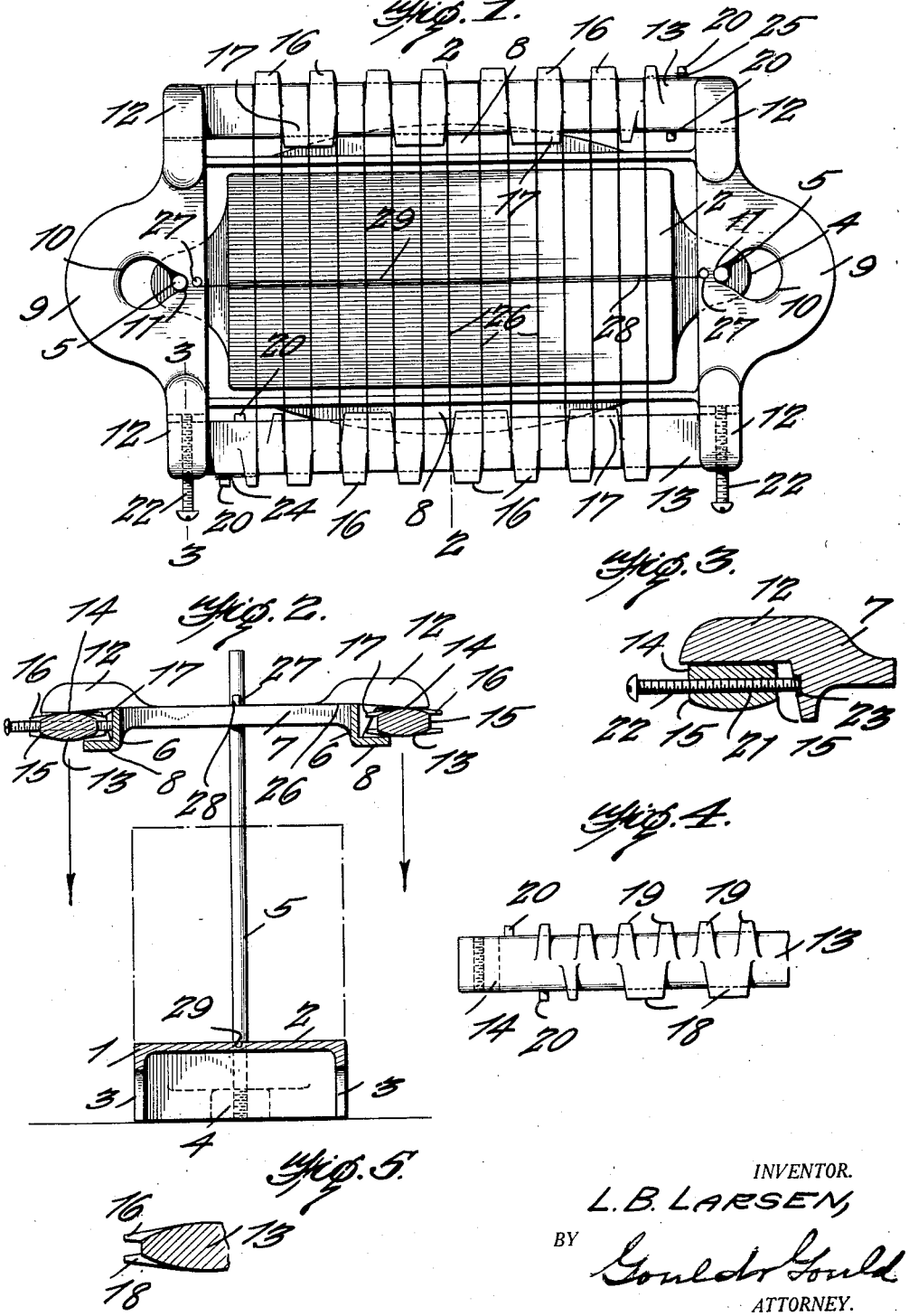
INVENTOR.
L. B. LARSEN,
BY Gould & Gould
ATTORNEY.

Patented Dec. 20, 1927.

1,653,578

UNITED STATES PATENT OFFICE.

LUDWIG B. LARSEN, OF PORTLAND, OREGON.

CUTTER.

Application filed October 26, 1926. Serial No. 144,305.

This invention is directed to an improvement in cutters of that type employing two relatively-movable members, one adapted to support a more or less plastic mass to be cut, and the other, carrying a series of cutters, usually a series of parallel wire lengths, being movable relative to the first to divide the plastic mass into a series of uniformly sized and shaped sections.

In the use of such a cutter for cutting butter, ice cream, or the like, it is frequently desirable to vary the size of the cut sections of the mass, in order that the mass, as a pound of butter or a pint or quart block of ice cream, may be made to yield a particular number of sections; and the present invention is particularly designed with a view of providing in a single machine, the capability of varying the spaced relation of the cutting wires, to thereby change the size of the sections, that is the width or thickness thereof, to cause the block mass to yield the required number of sections.

The main object of the present invention is, therefore, to provide means which may be adjusted or arranged in the assembled structure to cause the cutting wires to be spaced at different distances in different settings, to thereby cut the sections of the mass of such width as will produce the required number of sections from the mass in the operation of the machine.

A further object is the provision of wire-carrying bars having a series of differently-sized wire spacing lugs arranged in sets, with the lugs of any set adapted to be arranged in position to permit the interlacing therewith of a wire, to thereby provide spaced cutting wire lengths between the bars, the bars being arranged in the general assemblage to permit the lugs of any one set to be utilized at will, to thereby control the spacing of the cutting lengths of such interlaced wire, and correspondingly control the size of the mass-sections resulting from the operation.

A further object is the provision of means for mounting the bars relative to the cutting frame, whereby the bars are rigidly held in such frame in use, and yet conveniently removable when it is desired to vary the cutting size of the implement.

The invention is illustrated in the accompanying drawings, in which:—

Fig. 1 is a plan view of the improved cutter.

Fig. 2 is a sectional view, taken on the line 2—2 of Fig. 1.

Fig. 3 is a sectional view, taken on the line 3—3 of Fig. 1.

Fig. 4 is a bottom plan view of a portion of one of the wire-carrying bars.

Fig. 5 is a broken transverse section through one of the wire-carrying bars.

The improved cutter comprises a base 1, including a platform 2 on which the mass to be divided is placed, the base having supporting feet 3, and offset end lugs 4, removably carrying rod-like uprights 5, on which the cutting frame is guided in the cutting operation.

The cutting frame is of rectangular open form, comprising side bars 6 and end bars 7, the dimensions of the opening formed by said bars being somewhat greater than the similar dimensions of the platform 2. The side bars 6 are relatively thin, and are formed at their lower edges with outstanding supporting ledges 8, of maximum width at their central portions and of gradually reduced width toward the ends of the side bar, as indicated in dotted lines in Fig. 1.

The end bars 7, which are or may be integral with the side bars, are centrally formed to provide outstanding handle portions 9, formed with enlarged openings 10, the inner marginal edges of which are offset to form recesses 11, to receive and more or less accurately fit the uprights 5 of the base for guiding the cutting frame in its movements relative to the base. The ends of the end bars 7 are extended beyond the side bars in the form of guiding abutments 12, the under surfaces of which are squared and of sufficient width to receive and define the positions of the wire-carrying bars.

The wire-carrying bars, indicated generally at 13, are of substantially rectangular form at the ends to form square bearing portions 14 to fit accurately beneath the guiding abutments 12 of the frame end bars 7. The wire-carrying bars, intermediate the bearing portions 14, are of a somewhat oval contour in section, with, however, side edges 15 of appreciable width. The bars 13, intermediate the bearing portions 14, are formed on their upper and lower sides and at their inner and outer edges with wire-spacing lugs. There are thus four sets of these lugs, as 16, 17, 18, and 19, each set being in alinement on one edge of the bar 13, and the width of the lugs of one set and their relative spacing longitudinally of the bar varying from the width and spacing of the lugs of any other set. The lugs extend slightly beyond the marginal edges of the bar, and may be formed by cutting away the surface of the bar between the lugs, casting the bar and formed lugs, or independently securing the lugs in position, all of which are well known operations.

The marginal edges 15 of the bars 13 are provided at one end and on opposite sides with outstanding studs 20, to receive the wire terminals, and one of the bars 13 is formed in its bearing portions 14 with threaded openings 21, to receive adjusting screws 22, the upright faces of the guiding abutments at one side of the frame being recessed at 23, to receive the terminals of the screws 22.

The wire-carrying bars 13 are arranged with their bearing portions 14 beneath the guiding abutments 12 of the end bars of the cutting frame, care being taken that in such arrangement the similar wire-spacing lugs of such bars shall be at the upper outer edge of the bar as positioned. Obviously, and as contemplated but not shown, the bars may be marked to indicate the number of cut sections resulting from any particular set of lugs, thus insuring that the similarly marked lugs will be properly arranged in any particular setting.

The wire-carrying bars when thus positioned rest beneath the abutments 12 and on the ledges 8, and more or less in close contact with the side bars 6. A single length of wire is then applied to the bars, one terminal of the wire, as 24, being secured to the then outer stud 20 of one bar 13, passed beneath and around the immediately adjacent lug, across the opening formed by the side and end bars of the frame, beneath and around the opposite lug of the other bar 13, and back across the opening to the next lug of the first-mentioned bar. This interlacing of the wire is continued, until all the lugs, or as many as desired are engaged by the wire, when the final terminal of the wire is secured to the stud 20 of the remaining bar 13. As a result of this arrangement, the wire extends across the opening of the cutting frame as a series of parallel cutting strands 26, the relative spacing of which and thereby their cutting width, being determined by the width of the lugs selected for use. Of course the lugs on the respective bars of any similar sets are so formed than when the bars are positioned as described the lugs will be relatively offset to permit the lacing arrangement of the wire.

Following the positioning of the wire as described, the screws 22 are operated to force the bar 13 carrying such screws outwardly from the adjacent side bar of the cutting frame. The wire lengths extending across the frame opening are thus appropriately tensioned for effective cutting. As the bars 13 are supported on the ledges 8, and bare squarely at their ends beneath the abutments 12 of the frame, the tensioning of the cutting strands of wire, through operation of the screws 22, will not tend to turn the bars from their operative position. While the bars are thus held against turning, it is to be noted that they are not secured in any manner to the frame, but are wholly free to facilitate removal and reversal when it is desired to change the cutting width of the wires.

In the use of the cutter for some purposes, as for cutting sections of a block of ice cream for example, and assuming that the wire-spacing lugs have been selected to cut such ice cream block into a particular number of sections, such ice cream block is positioned on the platform 2, the cutting frame arranged to cooperate with the uprights 5, through recesses 11, and the frame moved downwardly to cause the cutting strands 26 to cut smoothly and evenly through the ice cream block, dividing the same into the required number of uniformly-sized sections at a single operation. As the respective sets of wire spacing lugs provide for different spacings between the cutting strands 26, and as the arrangement permits the ready and convenient assemblage of the parts to utilize any desired set of lugs, it is apparent that the single implement described provides for cutting the mass at will into sections of any one of four widths, simply through the rearrangement of the wire-carrying bars 13 and the relacing of the wire.

In the use of the cutter for cutting butter, the operation is similar to that described, except that in that use it is desirable to divide the butter mass longitudinally, as well as transversely. For this purpose, the end bars 7 of the cutting frame are provided with centrally-arranged studs 27, between which a cutting wire 28 may be extended for the longitudinal cutting. This wire 28 is to be removed when longitudinal cutting is not required.

If desired the platform 2 of the base may be formed with channels 29, one only of which is shown, into which the cutting wires may be moved in the cutting operation, to thus insure a complete severance of the adjacent sections of the mass being cut, though obviously from the comparatively small diameter of the cutting wire, a substantial severance of the sections will follow when the wires have reached the platform, even without the channels 29.

Having thus described the invention, what is claimed as new is:—

1. A wire carrying and spacing bar for use in cutters, comprising a member having sets of wire-receiving lugs projecting in opposite directions from the upper surface and from the lower surface.

2. A wire-carrying and spacing bar for use in cutters, comprising a member having sets of relatively-different spaced lugs projecting in opposite directions from the upper surface and from the lower surface.

3. A cutter including a cutting frame, wire-carrying bars arranged for cooperation with the frame, said frame having abutments to position and hold the wire-carrying bars in cooperation with the frame, each of said wire-carrying bars having sets of wire-receiving lugs projecting in opposite directions from the upper surface and from the lower surface of said bar, the abutments permitting reversal of the bars to position any set of lugs in wire-receiving relation on the frame.

4. A cutter including a cutting frame having side bars and end bars, abutments projecting in line with the end bars and beyond the side bars, and wire-carrying bars cooperating with said abutments and reversible with respect thereto, each of said wire-carrying bars having sets of relatively-different spaced lugs projecting in opposite directions from the upper surface and from the lower surface, the reversibility of the bars permitting any set of lugs to be arranged in wire-receiving relation on the frame.

5. A cutter including a cutting frame having side bars and end bars, the side bars being formed with supporting ledges, abutments projecting from the end bars, wire-receiving bars adapted to rest on the ledges and underlie the abutments when in wire receiving relation on the frame, said wire-receiving bars being free of connection with the frame to permit reversal of such bars on the frame at will, each of said wire-receiving bars having sets of wire-receiving lugs projecting in opposite directions from the upper surface and from the lower surface of such bar, the reversibility of such wire-receiving bars permitting any selected set of lugs to be used with the frame.

In testimony whereof, I affix my signature.

LUDWIG B. LARSEN. [L. S.]